(12) United States Patent
Brown et al.

(10) Patent No.: US 8,091,527 B1
(45) Date of Patent: Jan. 10, 2012

(54) METHOD AND APPARATUS FOR MANAGING COMBUSTION MODE TRANSITIONS IN AN INTERNAL COMBUSTION ENGINE

(75) Inventors: Alan W. Brown, Canton, MI (US); Jun-Mo Kang, Ann Arbor, MI (US); Chen-Fang Chang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/877,174

(22) Filed: Sep. 8, 2010

(51) Int. Cl.
*F01L 1/34* (2006.01)
*F02B 17/00* (2006.01)

(52) U.S. Cl. ..................... 123/295; 123/90.15
(58) Field of Classification Search ............ 123/295, 123/90.15–90.18
See application file for complete search history.

(56) References Cited

U.S. PATENT DOCUMENTS

| | | | |
|---|---|---|---|
| 4,958,606 A * | 9/1990 | Hitomi et al. ........... | 123/316 |
| 5,063,899 A | 11/1991 | Hitomi et al. | |
| 5,950,603 A * | 9/1999 | Cook et al. ........... | 123/520 |
| 6,863,048 B2 * | 3/2005 | Burkhard et al. ........... | 123/325 |
| 6,866,020 B2 * | 3/2005 | Allston et al. ........... | 123/399 |
| 7,367,308 B2 * | 5/2008 | Kuo et al. ........... | 123/295 |
| 7,690,350 B2 * | 4/2010 | Delp et al. ........... | 123/345 |
| 2006/0196469 A1 * | 9/2006 | Kuo et al. ........... | 123/305 |
| 2008/0066715 A1 * | 3/2008 | Jankovic ........... | 123/302 |
| 2009/0048760 A1 | 2/2009 | Chen et al. | |
| 2009/0229564 A1 | 9/2009 | Kang et al. | |
| 2009/0229565 A1 | 9/2009 | Kang et al. | |
| 2009/0259387 A1 * | 10/2009 | Kakuya et al. ........... | 701/103 |

* cited by examiner

Primary Examiner — Erick Solis

(57) ABSTRACT

An internal combustion engine includes two-step variable lift control mechanisms configured to control magnitude of valve lift of intake and exhaust valves to one of two discrete steps including low-lift valve open positions and high-lift valve open positions. A method for operating the engine includes commanding a transition from a first combustion mode to a second combustion mode. Upon commanding the transition, closing of a plurality of secondary throttle valves configured to control intake airflow to a plurality of intake runners upstream of a plurality of intake valves is initiated. Positions of the plurality of secondary throttle valves are then adjusted to achieve a preferred air charge. The two-step variable lift control mechanisms are then commanded to switch from a first of the two discrete steps to a second of the two discrete steps.

20 Claims, 3 Drawing Sheets

METHOD AND APPARATUS FOR MANAGING COMBUSTION MODE TRANSITIONS IN AN INTERNAL COMBUSTION ENGINE

TECHNICAL FIELD

This disclosure relates to an internal combustion engine configured to operate in two discrete combustion modes.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a cylinder when a piston is near top dead center (TDC) of a compression stroke, and the injected fuel ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge SI combustion mode. SI engines can be configured to operate in a homogeneous-charge compression-ignition (HCCI) combustion mode, also referred to as controlled auto-ignition combustion, under predetermined speed/load operating conditions. HCCI combustion is a distributed, flameless, auto-ignition combustion process that is controlled by oxidation chemistry. An engine operating in an HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich zones that form smoke and particulate emissions.

Engine airflow is controlled using an air intake system including a throttle valve and intake valves and exhaust valves. On engine systems so equipped, opening and closing of the intake valves and exhaust valves can be adjusted using a variable valve actuation system that includes variable cam phasing and a selectable multi-step valve lift, e.g., multiple-step cam lobes which provide two or more valve lift positions. A throttle position change is continuous, whereas changes in valve open positions of intake and exhaust valves controlled using multi-step valve lift mechanisms is discrete.

When an engine operates in a HCCI combustion mode, the engine operates at a lean or stoichiometric air/fuel ratio operation with the throttle valve wide open to minimize engine pumping losses. When the engine operates in the SI combustion mode, the engine operates in stoichiometric air/fuel ratio, with the throttle valve controlled over a range of positions from 0% to 100% of the wide-open position to control intake airflow to achieve the stoichiometric air/fuel ratio.

In an engine configured to operate in both SI and HCCI combustion modes, transitioning between combustion modes can be complex. Known engine control systems coordinate activations of multiple devices in order to provide a desired air/fuel ratio during operation in the different modes. During a transition between a HCCI combustion mode and an SI combustion mode, valve lift switching occurs nearly instantaneously, with a corresponding effect upon intake airflow, whereas adjustments to throttle valve opening and cam phasing have slower dynamics with slower corresponding effects upon intake manifold pressure and airflow. It is known that incomplete combustion and misfire leading to torque disturbances may occur during a transition due to an incomplete understanding of intake airflow dynamics and a corresponding inability to effectively control fueling and air/fuel ratio.

SUMMARY

An internal combustion engine includes two-step variable lift control mechanisms configured to control magnitude of valve lift of intake and exhaust valves to one of two discrete steps including low-lift valve open positions and high-lift valve open positions. A method for operating the engine includes commanding a transition from a first combustion mode to a second combustion mode. Upon commanding the transition, closing of a plurality of secondary throttle valves configured to control intake airflow to a plurality of intake runners upstream of a plurality of intake valves is initiated. Positions of the plurality of secondary throttle valves are then adjusted to achieve a preferred air charge. The two-step variable lift control mechanisms are then commanded to switch from a first of the two discrete steps to a second of the two discrete steps.

BRIEF DESCRIPTION OF THE DRAWINGS

One or more embodiments will now be described, by way of example, with reference to the accompanying drawings, in which.

DETAILED DESCRIPTION

Figure 1:
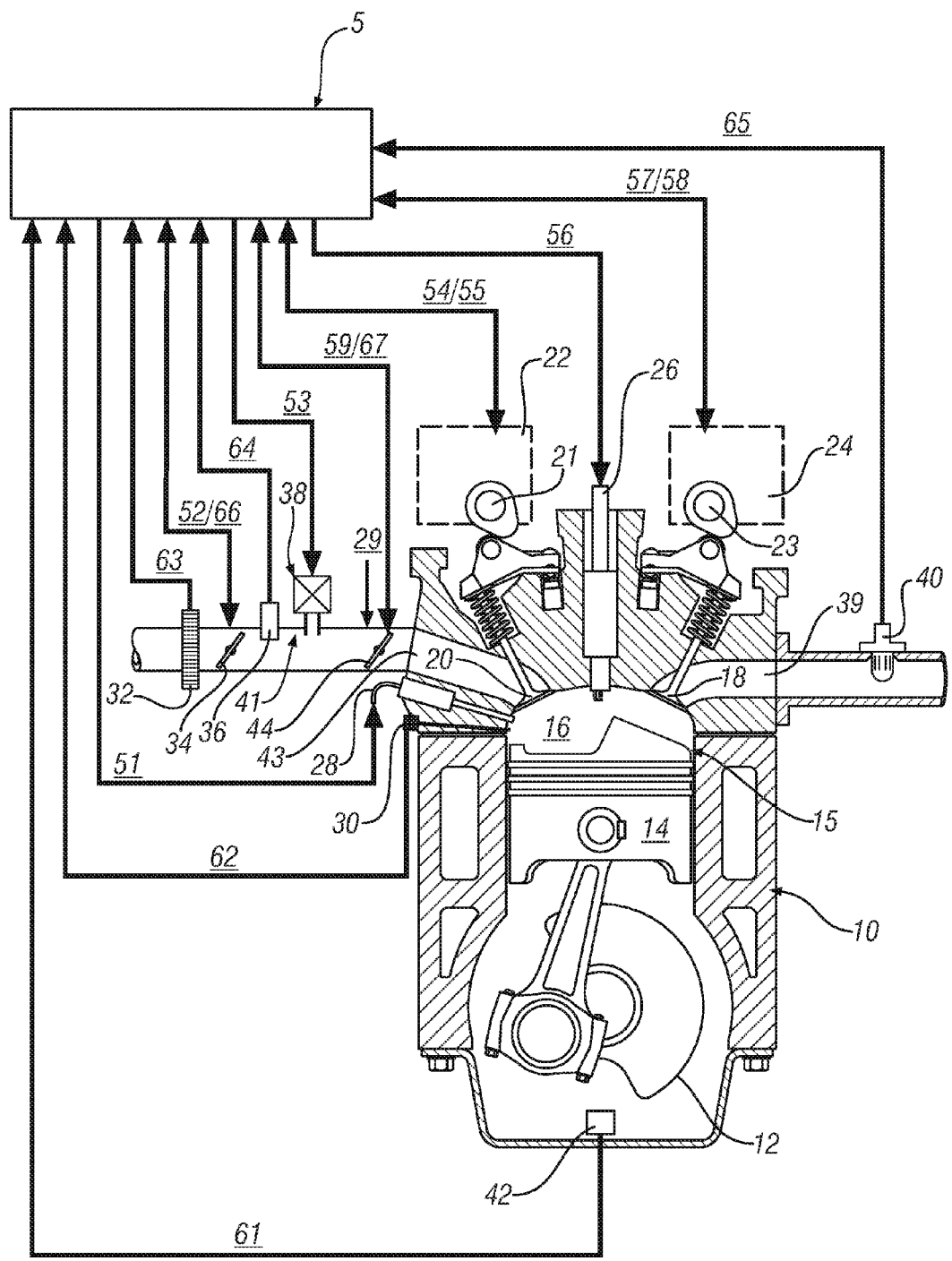
FIG. 1 is a schematic view of an internal combustion engine and an accompanying control module in accordance with the present disclosure.

Referring now to the drawings, wherein the depictions are for the purpose of illustrating certain exemplary embodiments only and not for the purpose of limiting the same, FIG. 1 is a section view of an internal combustion engine 10 and a schematic drawing of an accompanying control module 5 that have been constructed in accordance with an embodiment of this disclosure. The engine 10 is configured to operate in a homogeneous-charge compression-ignition (HCCI) combustion mode and a spark-ignition (SI) combustion mode. The engine 10 operates at a stoichiometric air/fuel ratio and at an air/fuel ratio that is primarily lean of stoichiometry. The disclosure can be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 connects to a rotating crankshaft 12 by which linear reciprocating motion is translated to rotational motion and torque.

An air intake system is configured to direct intake air to intake valves 20 that control flow to individual cylinders 15.

The air intake system includes a primary throttle valve 34 that is upstream of an intake manifold 29. The intake manifold 29 includes a plenum 41 which directs and distributes air into intake runners 43 corresponding to individual ones of the intake valves 20 to direct flow of gases to the combustion chambers 16. Each of the intake runners 43 is equipped with a secondary throttle valve 44. Alternatively, a single secondary throttle valve 44 can be placed in the plenum 41 of the intake manifold 29 upstream of the intake runners 43. The air intake system has airflow ductwork and devices for monitoring and controlling the air flow. The air intake devices preferably include a mass airflow sensor 32 that generates an output signal 63 indicating mass airflow into the intake manifold 29. The output signal 63 may also include information indicating intake air temperature. A pressure sensor 36 in the intake manifold 29 generates an output signal 64 corresponding to manifold absolute pressure. The output signal 64 can be used as an indicator of barometric pressure under certain conditions. An external flow passage recirculates exhaust gases from an exhaust manifold 39 to the intake manifold 29 and includes a flow control valve referred to as an exhaust gas recirculation (EGR) valve 38. The primary throttle valve 34 and the secondary throttle valves 44 are electronically controlled devices that are used to control airflow to the intake valves 20 in response to control signals 52 and 59, respectively, originating from the control module 5. A first throttle position sensor monitors an open position of the primary throttle valve 34 and generates an output signal 66 indicating throttle open position, preferably in units of % wide-open throttle. A second throttle position sensor monitors open positions of the secondary throttle valves 44 and generates an output signal 67 indicating open position, preferably in units of % wide-open throttle.

The control module 5 is operative to control mass flow of exhaust gas to the intake manifold 29 by controlling opening of the EGR valve 38 using a control signal 53.

The intake valve(s) 20 controls airflow into the combustion chamber 16. The exhaust valve(s) 18 control flow of exhaust gases out of the combustion chamber 16 to the exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24, respectively. The control module 5 generates control signals 54, 55 and 57, 58 to control the intake and exhaust VCP/VLC devices 22 and 24 in conjunction with rotations of an intake camshaft 21 and an exhaust camshaft 23 as described below. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps in response to the control signals 54 and 57, respectively. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing mechanism to control and adjust phasing (i.e., relative timing) of opening and closing of the intake valve(s) 20 and the exhaust valve(s) 18 respectively in response to the control signals 55 and 58, respectively. Adjusting phasing refers to shifting opening times of the intake and exhaust valve(s) 20 and 18 relative to positions of the crankshaft 12 and the piston 14 in the respective cylinder 15. The variable cam phasing mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electrohydraulic, hydraulic, and electric control force, controlled by the control module 5. Control signal 54 commands the intake VCP/VLC device 22 to switch and control valve lift of the intake valve(s) 20 to one of the two discrete steps. Control signal 55 commands the intake VCP/VLC device 22 to variably adjust and control the phasing of the intake camshaft 21 for each cylinder 15. Control signal 57 commands the exhaust VCP/VLC device 24 to switch and control valve lift of the exhaust valve(s) 18 one of two discrete steps. Control signal 58 commands the exhaust VCP/VLC device 24 to variably adjust and control the phasing of the exhaust camshaft 23 for each cylinder 15.

The engine 10 has a fuel injection system, including a plurality of high-pressure fuel injectors 28 each configured to directly inject a mass of fuel into one of the combustion chambers 16 in response to a control signal 51 from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a control signal 56 from the control module 5.

The engine 10 is equipped with various sensing devices for monitoring engine operation, including a crank sensor 42 having output an output signal 61 indicating crankshaft rotational position, which can be used to monitor engine crank angle and rotational speed. A combustion sensor 30 is configured to monitor in-cylinder combustion and generate an output signal 62 indicating a combustion state, e.g., pressure. An exhaust gas sensor 40 is configured to monitor an exhaust gas feedstream and generate an output signal 65 indicating an associated parameter, e.g., air/fuel ratio. The signals 61 and 62 that are output from the crank sensor 42 and the combustion sensor 30, respectively, are monitored by the control module 5 to determine combustion phasing, i.e., timing of combustion relative to the crank angle of the crankshaft 12 for each cylinder 15 for each combustion cycle. However, combustion phasing may also be determined by similar methods as may be known by those skilled in the art. The signal output 62 of the combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, exhaust gas fractions, and non-intrusive cylinder pressure sensors.

Control module, module, controller, processor and similar terms mean any suitable one or various combinations of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to monitor engine parameters. The control module 5 is configured to receive input signals from an operator (e.g., via an accelerator pedal and a brake pedal) to determine an operator torque request. The control module 5 monitors the sensors indicating the engine speed and intake air temperature, and coolant temperature and other ambient conditions.

The control module 5 executes algorithmic code stored therein to control the aforementioned actuators to form the cylinder charge, including generating the control signals 66 and 67 to control the primary and secondary throttle positions, control signal 56 for spark-ignition timing, control signal 51 for fuel injection mass and timing, control signal 53 for the EGR valve 38 to control flow of recirculated exhaust gases, and control signals 54, 55, 57, and 58 for intake and exhaust valve phasing and lift, respectively. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the input signal 65 of the exhaust gas sensor 40.

During engine operation in the HCCI combustion mode, primary throttle valve 34 and the secondary throttle valve 44 are both preferably substantially wide-open, with the engine 10 controlled at a lean or stoichiometric air/fuel ratio. The intake and exhaust valves 20 and 18 are in the low-lift valve open position and the intake and exhaust lift timing operate with NVO. Substantially wide-open throttle can include operating the primary throttle valve 34 fully un-throttled, or slightly throttled to create a vacuum in the intake manifold 29 to effect EGR flow. In one embodiment, in-cylinder EGR mass is controlled to a high dilution rate, e.g., greater than 40% of cylinder air charge. One or more fuel injection events can be executed during an engine cycle including at least one injection during a compression phase.

During engine operation in the spark-ignition combustion (SI) mode, secondary throttle valve 44 is wide-open and the primary throttle valve 34 is controlled to regulate the air flow. The engine 10 is controlled to a stoichiometric air/fuel ratio, and the intake and exhaust valves 20 and 18 are in the high-lift valve open positions and the intake and exhaust lift timing operate with positive valve overlap. Preferably, a fuel injection event is executed during compression phase of an engine cycle, preferably substantially before TDC. Spark-ignition is preferably discharged at a predetermined time subsequent to the fuel injection when air charge within the cylinder is substantially homogeneous.

The control module 5 transitions engine operation to the preferred combustion mode associated with the engine 10 to increase fuel efficiencies and engine stability, and/or decrease emissions. A change in one of the engine parameters, e.g., speed and load, can effect a change in an engine operation, which may cause the control module 5 to command a change in the preferred combustion mode.

Figure 2:
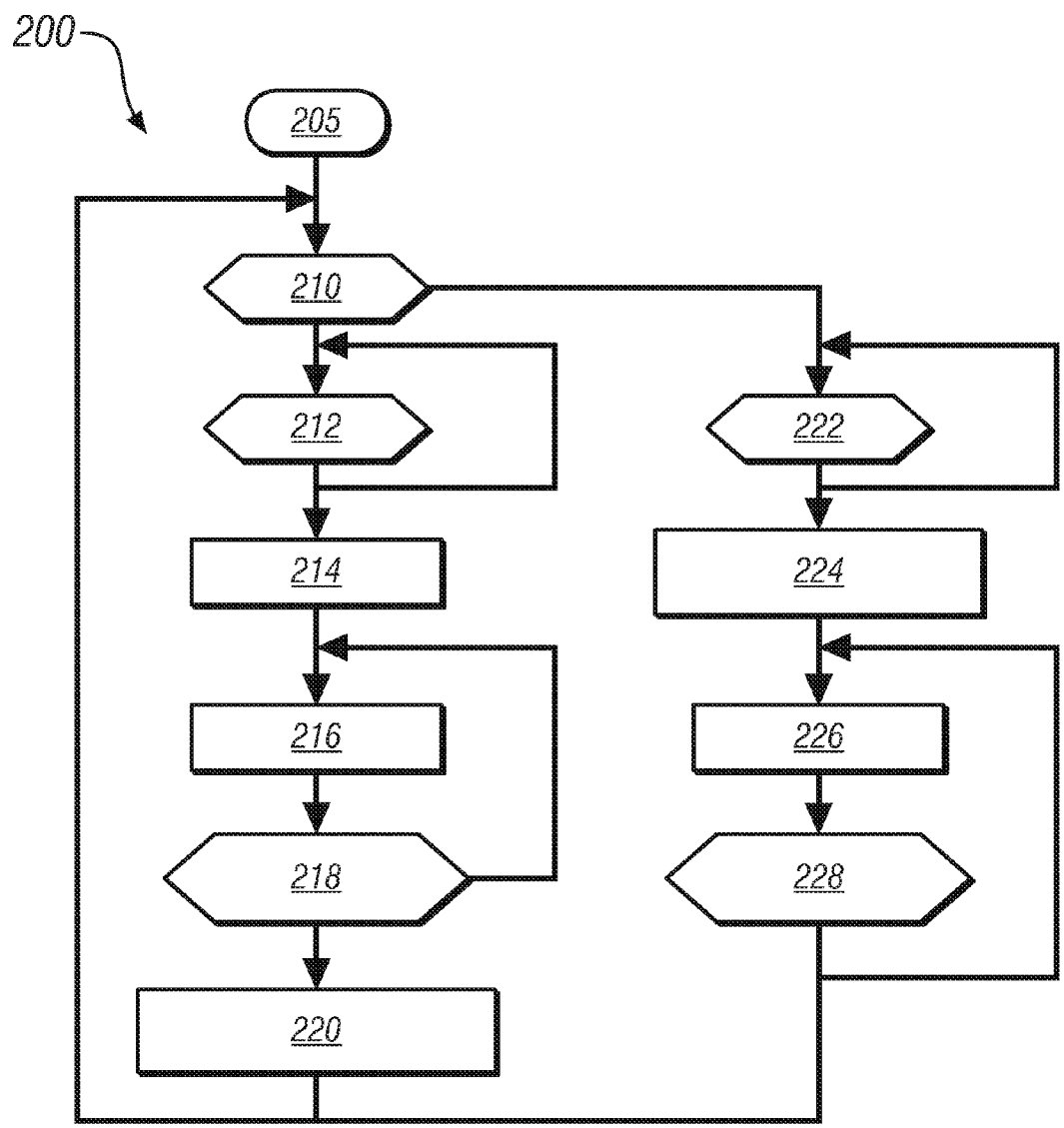
FIG. 2 schematically depicts a control scheme in flowchart form to control operation of an internal combustion engine to effect transitions between first and second combustion modes in accordance with the present disclosure.

FIG. 2 depicts a control scheme 200 in flowchart form that is executed in the control module 5 to control operation of the internal combustion engine 10 described with reference to FIG. 1 to effect transitions between first and second combustion modes. This includes effecting a transition from the HCCI combustion mode to the SI combustion mode, and effecting a transition from the SI combustion mode to the HCCI combustion mode.

The control scheme 200 includes regularly and ongoingly monitoring inputs from the aforementioned sensors to determine states of engine parameters including the operator torque request. This includes monitoring the sensors indicating the engine speed and intake air temperature, and coolant temperature and other ambient conditions (205). This includes determining whether the internal combustion engine 10 is presently operating in the HCCI combustion mode or the SI combustion mode (210).

When the internal combustion engine 10 is operating in the SI combustion mode, engine operation is monitored to determine if there is a command to transition to operate in the HCCI combustion mode (212). A command to transition to operate in the HCCI combustion mode can be based upon a change in an engine operating point that may be associated with an operator torque request, or another change in operation. When there is a command to transition to operate in the HCCI combustion mode, a first command is executed via control signal 52 to open the primary throttle 34 and coincidentally a second command is executed via control signal 59 to close the secondary throttle valves 44 to restrict airflow through the intake valves 20 (214). The openings of the secondary throttle valves 44 are subsequently adjusted to achieve and maintain a preferred or desired air charge in the combustion chambers 16, as indicated by airflow to the combustion chambers 16 (216). The desired air charge is associated with the operator torque request. A desired fueling for the cylinder charge is determined in response to the operator torque request. The desired fueling and engine rotational speed are combined with a preferred air/fuel ratio to calculate the desired air charge in each combustion chamber 16. Pressure in the intake manifold is monitored (218), preferably using the signal output 64 of the pressure sensor 36 indicating manifold absolute pressure, which is compared with a minimum threshold (218). When the intake manifold pressure is greater than the minimum threshold, it is determined that the engine 10 is in operating conditions that permit operation in the HCCI combustion mode. Transitioning to operate in the HCCI combustion mode includes switching the intake and exhaust valves 20 and 18 to operate in the low-lift valve open position, adjusting timing of the control signal 56 to provide spark energy to the spark plug 26 to a state that corresponds to operating in the HCCI combustion mode, and adjusting the timing of the control signal 51 for controlling fuel injection to an injection timing that corresponds to operating in the HCCI combustion mode (220). The engine operating states that correspond to operating in the HCCI combustion mode are known.

When the internal combustion engine 10 is operating in the HCCI combustion mode, engine operation is monitored to determine if there is a command to transition to operate in the SI combustion mode (222). When there is a command to transition to operate in the SI combustion mode, a first command is executed via control signal 52 to close the primary throttle 34 and coincidentally a second command is executed via control signal 59 to close the secondary throttle valves 44 to restrict airflow through the intake valves 20. Coincidentally, the intake and exhaust valves 20 and 18 are commanded to operate in the high-lift valve open position. Coincidentally, timing of the control signal 56 to provide spark energy to the spark plug 26 and the timing of the control signal 51 for controlling fuel injection are commanded to states that correspond to operating in the SI combustion mode (224). The openings of the secondary throttle valves 44 are subsequently adjusted to achieve and maintain a preferred or desired air charge in the combustion chambers 16, as indicated by airflow to the combustion chambers 16 (226). The transition is completed when the secondary throttle valves 44 have achieved a fully opened state (228). It is appreciated that the operating states that correspond to operating in the SI combustion mode are known.

Figure 3:
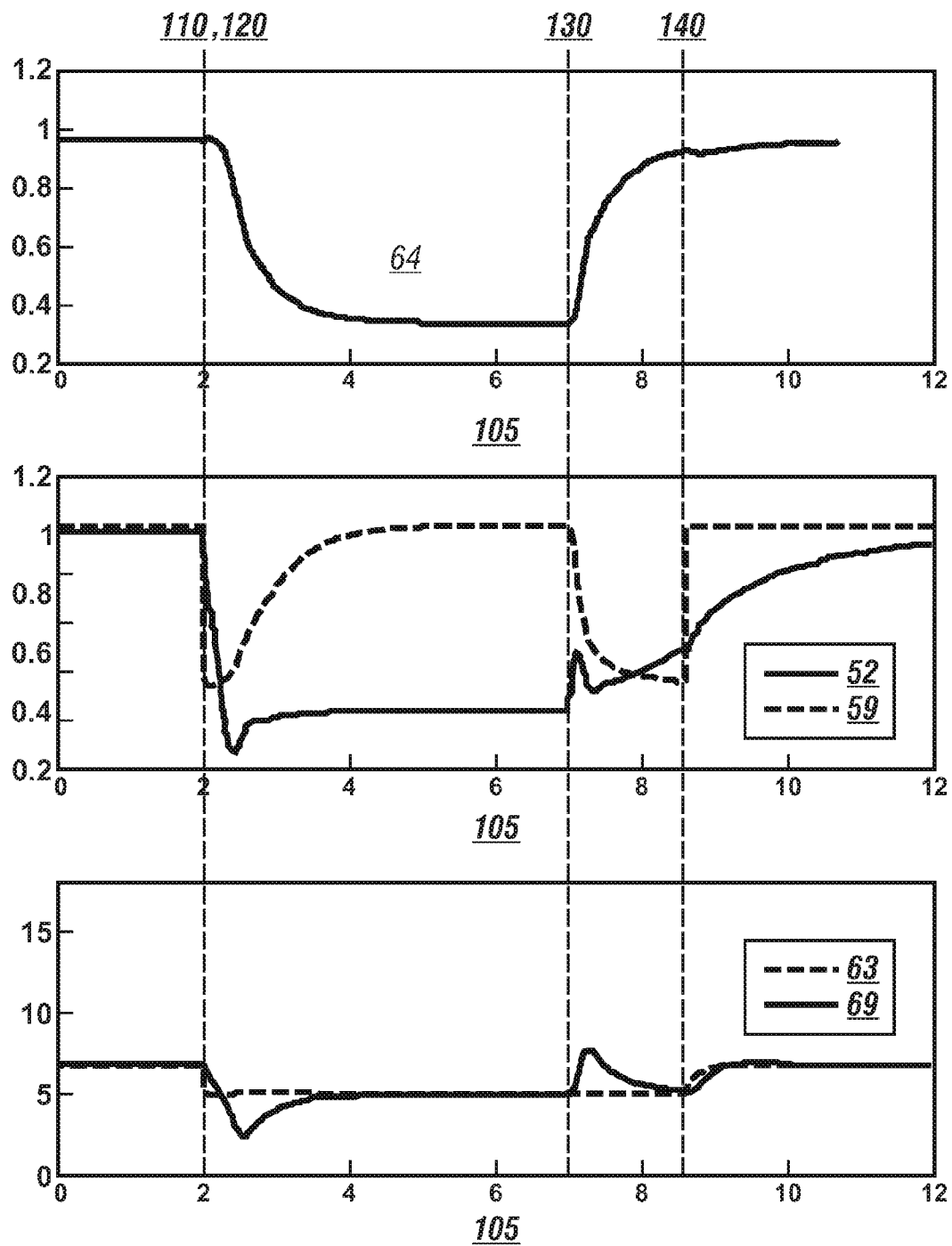
FIG. 3 graphically depicts parameters associated with operating an internal combustion engine using a control scheme to effect transitions between first and second combustion modes in accordance with the present disclosure.

FIG. 3 graphically depicts parameters associated with operating the internal combustion engine 10 described with reference to FIG. 1 using the control scheme 200 described with reference to FIG. 2 to effect transitions between first and second combustion modes. The depicted parameters associated with operating the internal combustion engine 10 are preferably simulated using a known airflow simulation model. The parameters include the output signal 64 corresponding to manifold absolute pressure, the control signal 52 commanding the open position of the primary throttle valve 34, preferably in units of % wide-open throttle, the control signal 59 commanding open position of the secondary throttle valves 44, preferably in units of % wide-open throttle, the output signal 63 indicating mass airflow into the intake manifold 29, and output data 69 indicating an estimated or predicted mass airflow into the intake runners 43 corresponding to individual ones of the intake valves 20. The states of the aforementioned parameters are plotted over elapsed time 105, which is in units of seconds.

A command is executed to switch from operating in the HCCI combustion mode to operating in the SI combustion mode (110). Coincidentally, the intake and exhaust valves 20 and 18 are commanded to operate in the high-lift valve open position, control signal 52 commands the primary throttle 34 to close and control signal 59 commands the secondary throttle valves 44 to close. Coincidentally, the intake and exhaust valves 20 and 18 are commanded to operate in the high-lift valve open position. Coincidentally, the control signal 56 to provide spark energy to the spark plug 26 and the control signal 51 for controlling timing and pulsewidth of the fuel injection are commanded to states that correspond to operating in the SI combustion mode (120).

During subsequent operation, the control signal 52 to the primary throttle 34 is adjusted to achieve a manifold absolute pressure that is associated with operating the engine 10 in the SI combustion mode and the control signal 59 to the secondary throttle valves 44 is adjusted to achieve a mass airflow to the cylinders that is associated with operating the engine 10 in the SI combustion mode. As indicated by the output signal 63 indicating mass airflow into the intake manifold 29 and the output data 69 indicating the predicted mass airflow into the intake runners 43, the mass airflow into the intake runners 43 remains relatively stable during this transition.

When there is a command to transition from operating in the SI combustion mode to operating in the HCCI combustion mode (130), a first command via control signal 52 opens the primary throttle 34 and coincidentally executes a second command via control signal 59 to close the secondary throttle valves 44. The openings of the secondary throttle valves 44 are subsequently adjusted to achieve and maintain a preferred or desired air charge in the combustion chambers 16, as indicated by airflow to the combustion chambers 16. The manifold absolute pressure is monitored, preferably using the signal output 64 of the pressure sensor 36, and is compared with a minimum threshold. When the manifold absolute pressure is greater than the minimum threshold, it is determined that the engine is in an operating condition that enables operation in the HCCI combustion mode. The engine is commanded to switch to operate in the HCCI combustion mode (140), which includes switching the intake and exhaust valves 20 and 18 to operate in the low-lift valve open position, adjusting timing of the control signal 56 to provide spark energy to the spark plug 26 to a state that corresponds to operating in the HCCI combustion mode, and adjusting the timing of the control signal 51 for controlling fuel injection to a state that corresponds to operating in the HCCI combustion mode. It is appreciated that the operating states that correspond to operating in the HCCI combustion mode are known.

As is indicated by the output signal 63 indicating mass airflow into the intake manifold 29 and the output data 69 indicating the predicted mass airflow through the intake runners 43, the mass airflow into the intake runners 43 remains relatively stable while the mass airflow through the primary throttle valve 34 varies.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating an internal combustion engine, the engine including two-step variable lift control mechanisms configured to control magnitude of valve lift of intake and exhaust valves to one of two discrete steps including low-lift valve open positions and high-lift valve open positions, the method comprising:
commanding a transition from a first combustion mode to a second combustion mode;
upon commanding the transition, initiating closing of a plurality of secondary throttle valves configured to control intake airflow to a plurality of intake runners upstream of a plurality of intake valves and then adjusting positions of the plurality of secondary throttle valves to achieve a preferred air charge; and then
commanding the two-step variable lift control mechanisms to switch from a first of the two discrete steps to a second of the two discrete steps.

2. The method of claim 1, wherein commanding the transition from the first combustion mode to the second combustion mode comprises commanding a transition from a spark ignition combustion mode to a homogeneous charge compression ignition combustion mode.

3. The method of claim 2, comprising opening a primary throttle valve located in an intake plenum upstream of the plurality of secondary throttle valves coincident with initiating closing of the plurality of secondary throttle valves.

4. The method of claim 3, wherein commanding the two-step variable lift control mechanisms to switch from the first of the two discrete steps to the second of the two discrete steps comprises:

monitoring air pressure in the intake plenum; and commanding the two-step variable lift control mechanism to switch from the high-lift valve open position to the low-lift valve open position when the air pressure in the intake plenum is greater than a predetermined threshold.

5. The method of claim 4, further comprising transitioning a fuel injection timing and an ignition timing to states corresponding to operating in the homogeneous charge compression ignition combustion mode subsequent to commanding the two-step variable lift control mechanism to switch from the high-lift valve open position to the low-lift valve open position.

6. The method of claim 1, wherein commanding the transition from the first combustion mode to the second combustion mode comprises commanding a transition from a homogeneous charge compression ignition combustion mode to a spark ignition combustion mode.

7. The method of claim 6, further comprising closing a primary throttle valve located in an intake plenum upstream of the plurality of secondary throttle valves coincident with initiating closing of the plurality of secondary throttle valves.

8. The method of claim 7, wherein commanding the two-step variable lift control mechanisms to switch from a first of the two discrete steps to a second of the two discrete steps comprises commanding the two-step variable lift control mechanism to switch from the low-lift valve open position to the high-lift valve open position coincident with the commanded transition from the homogeneous charge compression ignition combustion mode to the spark ignition combustion mode.

9. The method of claim 8, further comprising transitioning a fuel injection timing and an ignition timing to states corresponding to operating in the spark ignition combustion mode coincident with commanding the two-step variable lift control mechanism to switch from the low-lift valve open position to the high-lift valve open position.

10. The method of claim 9, wherein adjusting positions of the plurality of secondary throttle valves to achieve the preferred air charge comprises adjusting positions of the plurality of secondary throttle valves to fully open positions.

11. A method for effecting a transition from a first combustion mode to a second combustion mode in an internal combustion engine, comprising in sequence:

closing a plurality of secondary throttle valves configured to control intake airflow to a plurality of runners upstream of a plurality of intake valves;

adjusting positions of the plurality of secondary throttle valves to achieve a preferred air charge; and commanding a two-step variable lift control mechanism to switch from a first discrete step to a second discrete step.

12. The method of claim 11, wherein the first combustion mode comprises a spark ignition combustion mode and the second combustion mode comprises a homogeneous charge compression ignition combustion mode.

13. The method of claim 12, further comprising opening a primary throttle valve located in an intake plenum upstream of the plurality of secondary throttle valves coincident with closing the plurality of secondary throttle valves.

14. The method of claim 13, wherein commanding the two-step variable lift control mechanism to switch from the first discrete step to the second discrete step comprises:

monitoring air pressure in the intake plenum; and commanding the two-step variable lift control mechanism to switch from a high-lift valve open position to a low-lift valve open position when the air pressure in the intake plenum is greater than a predetermined threshold.

15. The method of claim 14, further comprising transitioning a fuel injection timing and an ignition timing to states corresponding to operating in the homogeneous charge compression ignition combustion mode subsequent to commanding the two-step variable lift control mechanism to switch from the high-lift valve open position to the low-lift valve open position.

16. The method of claim 11, wherein the first combustion mode comprises a homogeneous charge compression ignition combustion mode and the second combustion mode comprises a spark ignition combustion mode.

17. The method of claim 16, further comprising closing a primary throttle valve located in an intake plenum upstream of the plurality of secondary throttle valves coincident with closing the plurality of secondary throttle valves.

18. The method of claim 17, wherein commanding the two-step variable lift control mechanism to switch from the first discrete step to the second discrete step comprises commanding the two-step variable lift control mechanism to switch from a low-lift valve open position to a high-lift valve open position coincident with closing the plurality of secondary throttle valves.

19. The method of claim 18, further comprising transitioning a fuel injection timing and an ignition timing to states corresponding to operating in the spark ignition combustion mode coincident with commanding the two-step variable lift control mechanism to switch from the low-lift valve open position to the high-lift valve open position.

20. The method of claim 19, wherein adjusting positions of the plurality of secondary throttle valves to achieve the preferred air charge comprises adjusting positions of the plurality of secondary throttle valves to fully open positions.

\* \* \* \* \*